(12) United States Patent
Mair et al.

(10) Patent No.: US 7,618,048 B2
(45) Date of Patent: Nov. 17, 2009

(54) JOINT ARRANGEMENT IN A VEHICLE HAVING A KNUCKLE STEERING SYSTEM

(75) Inventors: Ulrich Mair, Friedrichshafen (DE); Friedrich Saibold, Passau (DE); Klaus Kruber, Künzing (DE); Stefan Wallner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/858,466

(22) Filed: Sep. 20, 2007

(65) Prior Publication Data
US 2008/0150248 A1   Jun. 26, 2008

(30) Foreign Application Priority Data
Sep. 21, 2006   (DE)   ................ 10 2006 044 450

(51) Int. Cl.
B62D 7/18   (2006.01)
(52) U.S. Cl. .................................. 280/93.512
(58) Field of Classification Search ............ 280/93.512, 280/93.51, 93.511
See application file for complete search history.

(56) References Cited

U.S. PATENT DOCUMENTS 3,219,372 A * 11/1965 Herbenar et al. ................ 403/7
2006/0096800 A1   5/2006 Saibold et al.

FOREIGN PATENT DOCUMENTS

| DE | 195 26 453 C1 | 11/1996 |
| DE | 102004053722 A1 | 5/2006 |
| WO | WO-00/48894 | 8/2000 |

* cited by examiner

Primary Examiner—Faye M. Fleming
(74) Attorney, Agent, or Firm—Davis & Bujold, P.L.L.C.

(57) ABSTRACT

A joint arrangement is proposed in a vehicle having a knuckle steering system where the steering linkage comprises one tie rod (2) flexibly connected with the steering cylinder via one joint (9), on lever element (3) flexibly connected with the tie rod (2) and the axle bridge (1) via one joint (7) provided between the tie rod (2) and the lever element (3) and one joint (8) provided between the elver element (3) and the axle bridge (1) and one coupler (5) flexibly connected with the axle head (6) and the tie rod (2) via one joint (10) provided between the coupler (5) and the tie rod (2), the lever element (3) and the coupler (5) being connected with the tie rod (2) via a double joint (6), at least one joint (7) being designed as radial joint and the other joints (8, 9, 10) as ball joints.

9 Claims, 3 Drawing Sheets

= RADIAL JOINT

= BALL JOINT

JOINT ARRANGEMENT IN A VEHICLE HAVING A KNUCKLE STEERING SYSTEM

Figure 1:
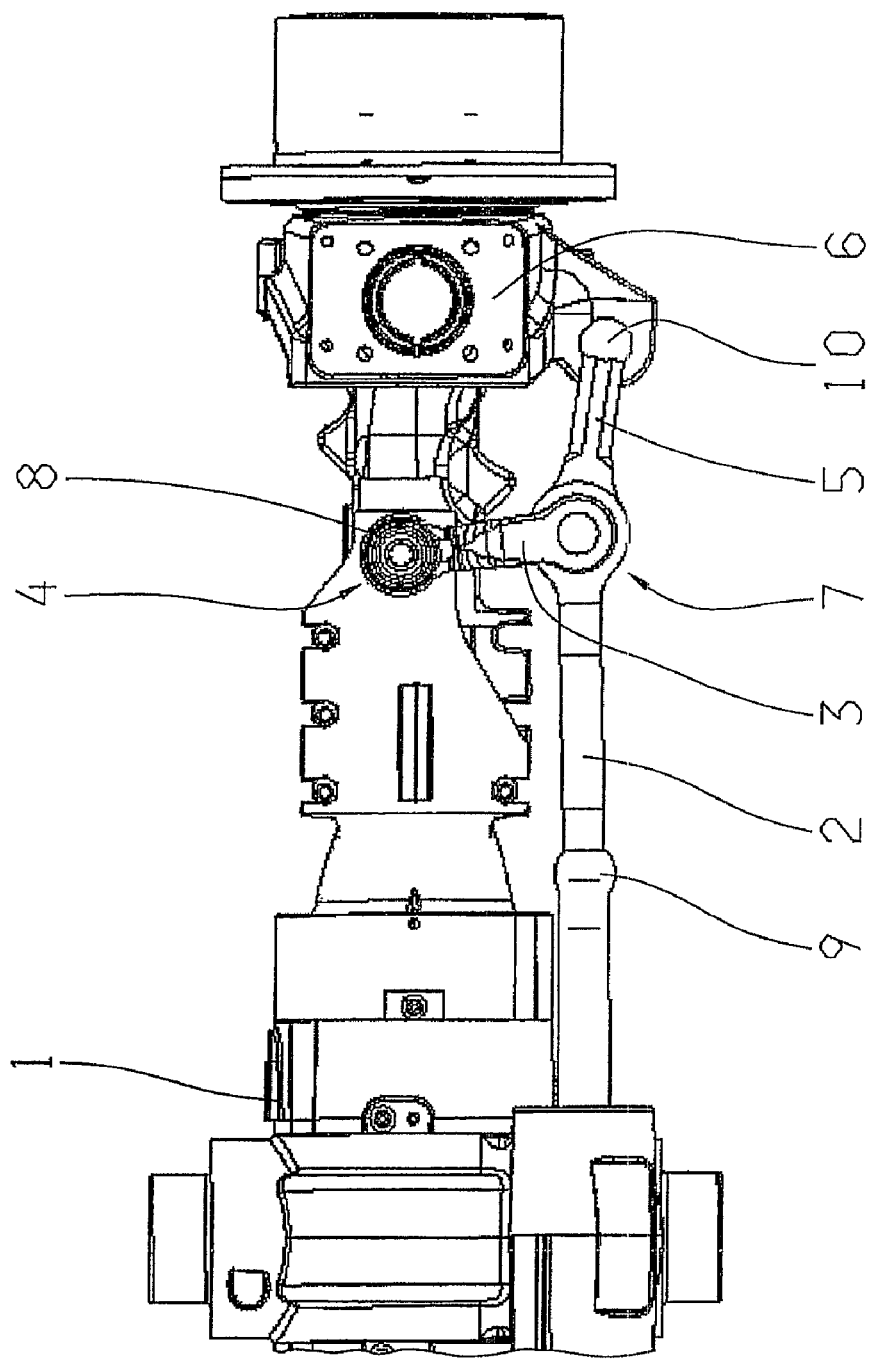

According to the preamble of claim 1, the instant invention relates to a joint arrangement in a vehicle having a knuckle steering system where, in the area between the main steering cylinder device and a wheel mount or axle head, a steering kinematics is flexibly in operative connection with a lever element rotatable around a fixed pivot point on the axle bracket.

Vehicles having at least one steerable axle are known from the prior art. Steering movements of the driver are transmitted to the wheels of the steerable axle via a steering wheel, a steering column, a steering gear and on the wheels of the steerable axle, a swinging kinematics comprising several parts.

According to the prior art, the steering system can be designed as fifth-wheel steering or as knuckle steering. In the fifth-wheel steering system the wheels of the vehicle are turned, according to the steering angle required, together with an axle extending between the wheels in transverse direction of the vehicle, around a common pivot. The fifth wheel steering ensures a high turning capacity but has the disadvantage that the stable surface of the vehicle is reduced resulting in an increase of the tipping gradient.

In a knuckle steering each wheel of the steerable vehicle axle turns around its own pivot pin, the pivot pins being formed by the connections of the steering points of the wheel suspension or by the axles of the knuckle pin. Knuckle steering has the advantage that the stable surface of the vehicle remains precisely the same size. Knuckle steering systems are usually employed in construction machinery, the driver's steering movements being applied via a main cylinder designed as a synchronous cylinder with a traversing piston rod.

To prevent the occurrence of undesired sliding motion in addition to the rolling motion of the wheels, in knuckle steering, around a curve, the angle of lock of the inner wheel must be larger than the angle of lock of the outer wheel. Besides, according to the Ackermann principle, the lengthened center lines of the knuckle of the locked wheels must meet on the lengthened center line of a second non-steerable vehicle axle for operation with minimal wear or intersect precisely at one point with the lengthened center lines of the knuckle of the wheels of a second steerable axle. Thereby the orbits traversed by the wheels of the two vehicles axles have a common center point whereby the sliding motions of the wheels are considerably reduced. When the extensions of the center lines of the knuckles of the wheel do not meet at one point, a steering angle error exists with, the load of the tires increasing as the steering angle error increases.

Within the scope of the applicant's DE 10 2004 053 722 A1 is describe a vehicle having at least one axle steerable via a knuckle steering system. The knuckle steering system is here designed with a main steering system device, flexibly connected with tie rods, each of which is in operative connection with a wheel support. It is provided in the knuckle steering system that the steering kinematics of the knuckle steering be flexibly in operative connection, in the area between the main cylinder device and a wheel support, with a lever element rotatable around a fixed pivot so that according to a position of the pivot and a position of the lever element, a steering angle error, corresponding to a required steering angle, be minimized, around a curve, essentially by a reduction of the angle of lock of the respective curve outer wheel in relation to the angle of lock of the respective inner wheel.

In addition it is provided pursuant to 10 2004 053 722 A1 that the tie rods and the wheel supports or the axle heads of the wheels be connected each via a tie rod and a coupler; the tie rods and the main steering cylinder device are respectively connected via a piston rod joint. The lever element is connected with the tie rod, via one other tie rod joint, wherein the tie rod joint can be designed as a double joint which connects, on one hand, the tie rod, via the coupler, with the wheel support or with the axle head and, on the other, the tie rod with the lever element. Besides, the steering point of the lever element is fixedly connected with a rigid axle extending substantially in transverse direction of the vehicle between the wheels of the vehicle axle, or with the axle bracket.

Here arises the problem of finding a kinematically stable or definite joint system comprising five joints and in which the tolerances are compensated.

The problem on which this invention is based is, on the basis of the cited prior art, to indicate a kinematically stable joint system that extensively compensates the tolerances that occur in a vehicle having a knuckle steering system where the steering rods comprise one tie rod flexibly connected with the steering cylinder via one joint, one lever element flexibly connected with the tie rod and the axle bracket via joints and one coupler, flexibly connected with the axle head and the tie rod via joints, the lever element and the coupler being connected with the tie rod via a double joint.

This problem is solved by the features of Claim 1. Other inventive developments and advantages result from the subclaims.

Accordingly a joint arrangement is proposed in a vehicle having a knuckle steering system in which the steering rods comprise one tie rod flexibly connected with the steering cylinder via one joint, one lever element flexibly connected with the tie rod and the axle bracket via a joint provided between the tie rod and the lever element and one joint provided between the lever element and the axle bracket and one coupler flexibly connected with the axle head and the tie rod via one joint provided between the coupler and the axle head and one joint provided between the coupler and the tie rod, the lever element and the coupler being connected with the tie rod, via a double joint, in which at least one joint is designed as a radial joint and the other joints as ball joints.

With the inventive idea the tolerances are compensated by the ball joints so that in case of kinematic clearness the wear of at least one radial joint is minimized.

According to an especially advantageous embodiment of the invention, the joints between tie rods and steering cylinder, between the lever element and the axle bracket and between coupler and axle bracket, are designed as ball joints, the double joint between the lever element or the coupler and the tie rods being designed as double radial joints.

This embodiment is kinematically clear, the tolerances being compensated by the ball joints. It has the added advantage that the installation space required for the double joint is minimized.

Figure 2:
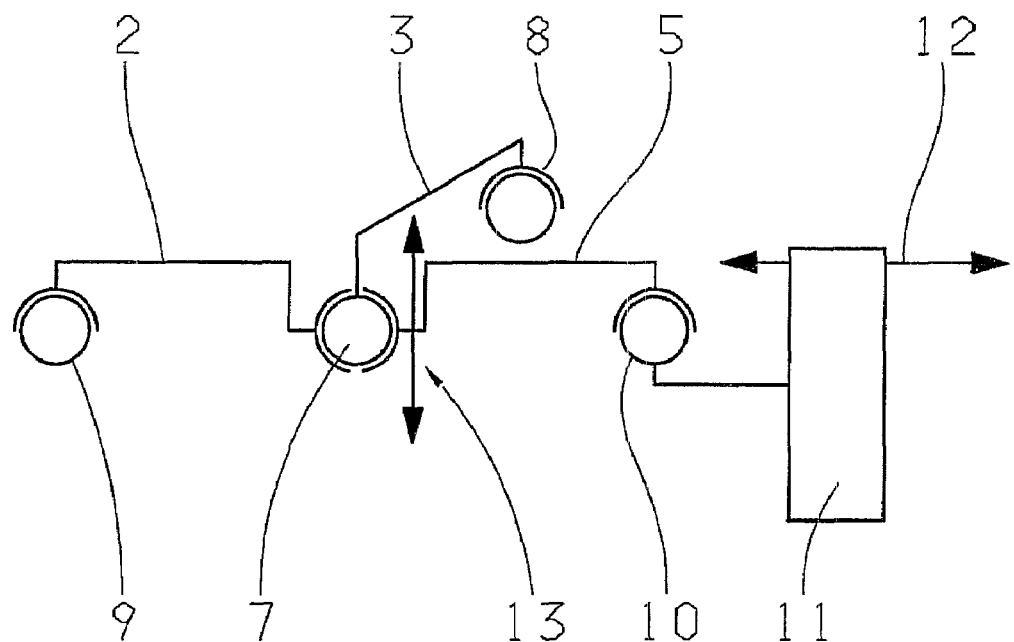
Figure 3:
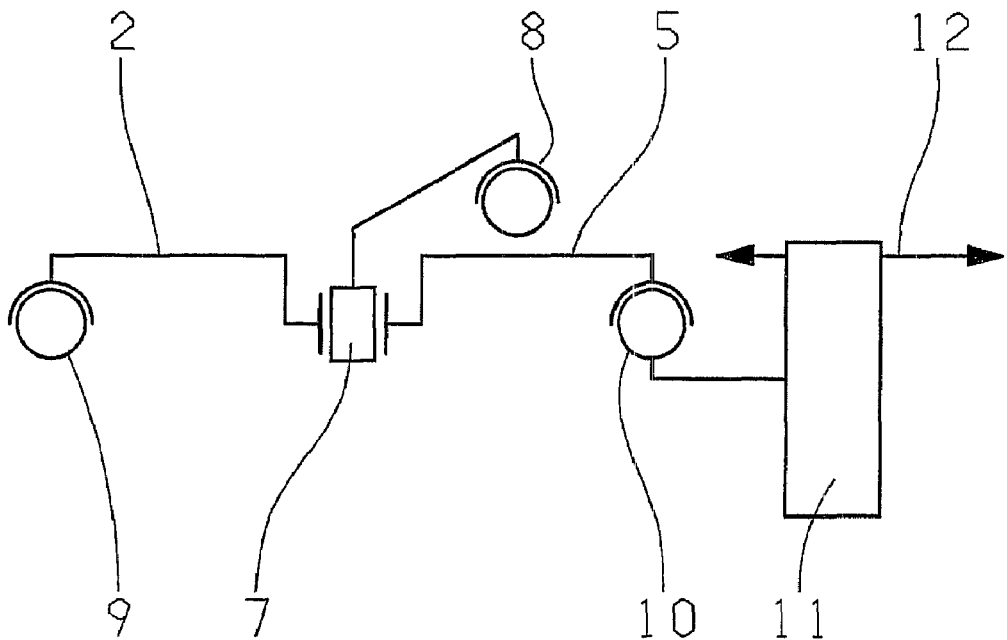
Figure 4:
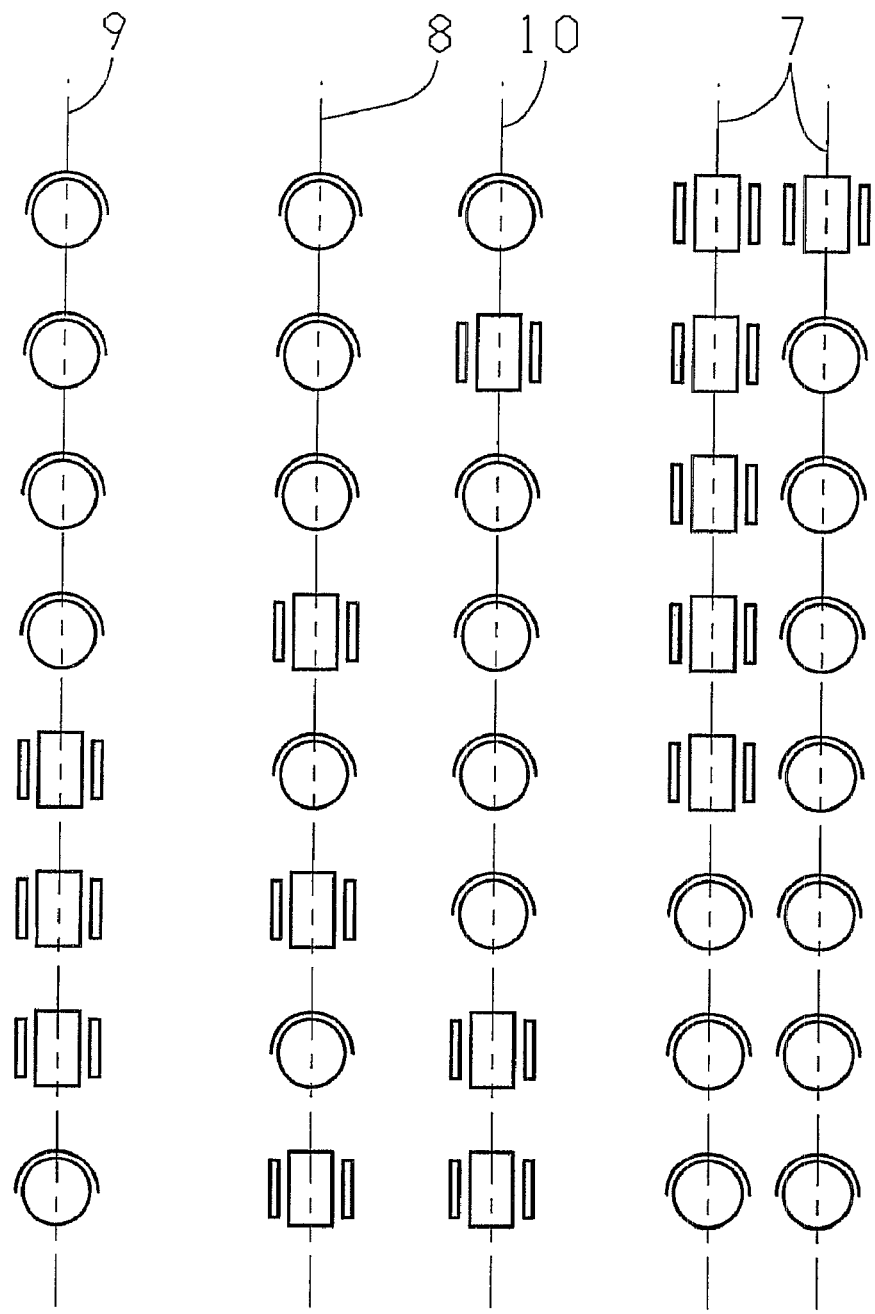
Figure 4:
Figure 4:

Herebelow the invention is explained in detail by way of example with reference to the enclosed figures which show:

FIG. 1 as a diagrammatic view of a knuckle steering system where the steering rods comprise one tie rod flexibly connected with the steering cylinder, one lever element flexibly connected with the tie rod and the axle bracket and one coupler flexibly connected with the axle head and the tie rod, the lever element and the coupler bing connected with the tie rod via a double joint;

FIG. 2 as a joint system where all joints are designed as ball joint;

FIG. 3 as a joint system according to a preferred embodiment of the invention; and FIG. 4 as a table for illustration of the inventive joint systems.

In FIG. 1 is the right part of a knuckle steering system of a steerable vehicle which according to the applicant's DE 10 2004 053 722 A1 comprises one lever element 3 flexibly connected with the tie rod 2 and tied via a joint 8 to the axle bracket 1; the tying point on the axle bracket is designated with 4. As is seen from the Figure, the steering linkage comprises, together with the tie rod 2 connected with a steering cylinder via a joint 9 and the lever element 3, a coupler 5 which is flexibly connected, on one hand, via a joint 10 with the axle head 4 and, on the other, with the tie rod 2, the joint 7 being designed as double joint for flexibly connecting the lever element 3 and the coupler 5 with the tie rod 2.

In the example of FIG. 2 is shown a joint system where all joints are designed as ball joints which even though kinematically definite, in the vertical direction are unstable. In the system shown, similarly to the illustration of FIG. 1, the joint between tie rod 2 and steering cylinder is designated with 9, the joint between lever element 3 and axle bracket 1 with 8, the joint between coupler 5 and axle head 6 with 10 and the double joint between the lever element 3 or the coupler 5 and the tie rod 2 with 7. The steering motion of the wheel 11 is illustrated by the arrow 12. In this design the double joint 7 can disadvantageously buckle in the vertical direction (arrow 13).

According to a specifically advantageous embodiment of the invention, the joints 9, 8, 10 between tie rod 2 and the steering cylinder, between lever element 3 and axle bracket 1 and between coupler 5 and axle head 6 are designed as ball joints; the double joint 7 between the lever element 3 or the coupler 5 and the tie rod 2 is designed as double radial joint. This embodiment is the object of FIG. 3.

Other joint systems which are kinematically clear and compensate tolerances are to be understood from the table of FIG. 4. Each row here corresponds to an inventive joint system, each column reproducing the design of a joint within the scope of a joint system. The columns are in sequence joint 9 (between tie rod 2 and steering cylinder), joint 8 (between lever element 3 and axle bracket 1), joint 10 (between coupling 5 and axle head 6) and double joint 7. The joint arrangement according to the first row corresponds to the arrangement shown in FIG. 3.

It is also possible according to the invention to design the joints 8, 9 and one joint of the double joint 7 as ball joints, the joint 10 and one joint of the double joint 7 being designed as radial joints (second row of the table of FIG. 4).

Within the scope of a third embodiment of the invention (according to the third row of the table of FIG. 4) it is proposed to design the joints 8, 9 and 10 and one joint of the double joint 7 as ball joints and one joint of the double joint 7 as radial joint.

It is also possible (according to the fourth row of the table of FIG. 4), to design as ball joints the joints 9 and 10 and one joint of the double joint 7 and as radial joints the joint 8 and one joint of the double joint 7. As can be seen from FIG. 4 (according to the fifth row of the table), the joints 8 and 10 and one joint of the double joint 7 can be designed as ball joints and the joint 9, the same as one joint of the double joint 7, as radial joints.

One other possibility of a joint system consists in that (according to the sixth row of the table of FIG. 4), the joints 7 and 10 be designed as ball joints and the joints 8 and 9 as radial joints. Alternative to this the joints 7 and 8 can be designed as ball joints and the joints 9 and 10 as radial joints, as is to be understood from the seventh row of the table of FIG. 4.

Within the scope of one other embodiment of the invention it can be further provided (according to the eighth row of the table of FIG. 4) that the joints 7 and 9 be designed as ball joints and the joints 8 and 10 as radial joints.

Reference Numbers 1 axle bracket
2 tie rod
3 lever element
4 tying point
5 coupler
6 axle head
7 double joint
8 joint between lever element and axle bracket
9 joint between tie rod and steering cylinder
10 joint between couple and axle head
11 wheel
12 direction of the steering movement
13 direction of movement of the double joint resulting in buckling of the joint

The invention claimed is:

1. A joint arrangement in a knuckle steering system of a vehicle, the joint arrangement comprising:
a fourth joint connected between a coupler and an axle head supporting a tire;
a third joint connected between a steering cylinder and a tie rod;
a second joint connected between an axle bracket and a lever element; and
a double joint supported by the lever element and the double joint including a first connection with the tie rod and a second connection with the coupler, thereby linking the axle head and the tie rod to the axle bracket through the lever element;
wherein at least one of the double joint, the second joint, the third joint and the fourth joint is a radial joint while others of the double joint, the second joint, the third joint and the fourth joint are ball joints.

2. The joint arrangement of the knuckle steering system according to claim 1, wherein the second joint (8), the third joint (9) and the fourth joint (10) are ball joints, and the double joint (7) is a double radial joint.

3. The joint arrangement of the knuckle steering system according to claim 1, wherein the second joint (8), the third joint (9) and a first joint of the double joint (7) are all ball joints, while the fourth joint (10) and a second joint of the double joint (7) are both radial joints.

4. The joint arrangement of the knuckle steering system according to claim 1, wherein the second joint (8), the third joint (9), the fourth joint (10) and a first joint of the double joint (7) are all ball joints, and a second joint of the double joint (7) is a radial joint.

5. The joint arrangement of the knuckle steering system according to claim 1, wherein the third joint (9), the fourth joint (10) and a first joint of the double joint (7) are all ball joints, and the second joint (8) and a second joint of the double joint (7) are both radial joints.

6. The joint arrangement of the knuckle steering system according to claim 1, wherein the second joint (8), the fourth joint (10) and a first joint of the double joint (7) are all ball joints and the second joint (9) and a second joint of the double joint (7) are both radial joints.

7. The joint arrangement of the knuckle steering system according to claim 1, wherein the first joint (7) and the fourth joint (10) are ball joints and the second joint (8) and the third joint (9) are radial joints.

8. The joint arrangement of the knuckle steering system according to claim 1, wherein the first joint (7) and the second joint (8) are ball joints and the third joint (9) and the fourth joint (10) are radial joints.

9. The joint arrangement of the knuckle steering system according to claim 1, wherein the first joint (7) and the third joint (9) are ball joints and the second joint (8) and the fourth joint (10) are radial joints. a joint arrangement in a knuckle steering system of a vehicle.

\* \* \* \* \*